(12) United States Patent
Tomas

(10) Patent No.: US 8,790,040 B2
(45) Date of Patent: Jul. 29, 2014

(54) METHOD OF FORMING A PROTECTION SYSTEM AND THE PROTECTION SYSTEM

(75) Inventor: Julek Romuald Tomas, Aberdeen (GB)

(73) Assignee: Subsea 7 Limited, Sutton (GB)

( * ) Notice: Subject to any disclaimer, the term of this patent is extended or adjusted under 35 U.S.C. 154(b) by 192 days.

(21) Appl. No.: 13/516,644

(22) PCT Filed: Dec. 16, 2010

(86) PCT No.: PCT/GB2010/052119
§ 371 (c)(1),
(2), (4) Date: Aug. 1, 2013

(87) PCT Pub. No.: WO2011/073669
PCT Pub. Date: Jun. 23, 2011

(65) Prior Publication Data
US 2014/0007969 A1    Jan. 9, 2014

(30) Foreign Application Priority Data
Dec. 16, 2009  (GB) .................................. 0921946.0

(51) Int. Cl.
*F16L 1/12*    (2006.01)
(52) U.S. Cl.
USPC ..................... 405/169; 405/184.4; 405/183.5
(58) Field of Classification Search
USPC ........... 405/157, 158, 166, 168.3, 169, 183.5, 405/184.4
See application file for complete search history.

(56) References Cited

U.S. PATENT DOCUMENTS

| | | | |
|---|---|---|---|
| 3,563,825 A * | 2/1971 | Segura et al. ................. | 405/157 |
| 4,480,943 A | 11/1984 | Leuenberger | |
| 4,892,442 A * | 1/1990 | Shoffner .................... | 405/183.5 |
| 5,044,826 A * | 9/1991 | Forster .......................... | 405/169 |
| 5,238,328 A * | 8/1993 | Adams et al. ................ | 405/183.5 |
| 5,494,374 A * | 2/1996 | Youngs et al. ................ | 405/157 |
| 5,692,545 A | 12/1997 | Rodrigue | |
| 6,774,311 B1 | 8/2004 | Byun | |
| 6,786,677 B2 * | 9/2004 | Finzel et al. ................ | 405/183.5 |
| 6,796,743 B2 * | 9/2004 | Nothofer et al. ........... | 405/183.5 |
| 2003/0103811 A1* | 6/2003 | Grimseth ..................... | 405/157 |

FOREIGN PATENT DOCUMENTS

| | | | | |
|---|---|---|---|---|
| AU | 589 576 | | 10/1989 | |
| EP | 1 686 301 | | 8/2006 | |
| GB | 2356883 A | * | 6/2001 | ........... E21B 33/037 |
| NL | 7713055 | | 5/1977 | |
| WO | WO 97/36063 | | 10/1997 | |
| WO | WO 02/14732 | | 2/2002 | |

\* cited by examiner

*Primary Examiner* — Frederick L Lagman
(74) *Attorney, Agent, or Firm* — Levy & Grandinetti (57) ABSTRACT

A method of forming a protection system and a protection system for a secondary conduit adapted to be coupled to a main conduit is disclosed. The main conduit and the secondary conduit are for installation below the sea surface. The method includes spooling onto a reel an elongate member in a first configuration for transportation and/or storage until such a time that it is ready to be deployed. The first configuration is a substantially planar configuration. The method also includes paying the elongate member out from the spool and causing or allowing the elongate member to adopt a second configuration and form the protection system for the secondary conduit. The second configuration is a substantially non-planar configuration. The elongate member is coupled to an external surface of the main conduit.

18 Claims, 6 Drawing Sheets

Fig. 11 ately secure the upper cap 14 to the
METHOD OF FORMING A PROTECTION SYSTEM AND THE PROTECTION SYSTEM This Application is the U.S. National Phase of International Application Number PCT/GB2010/052119 filed on Dec. 16, 2010, which claims priority to Great Britain Application Number 0921946.0 filed on Dec. 16, 2009.

BACKGROUND OF THE INVENTION (1) Field of Invention

The present invention relates to an apparatus and method for protecting a conduit which may be a cable to be installed subsea and particularly but not exclusively relates to a method and apparatus for protecting a cable such as a Direct Electrical Heating (DEH) cable that is attached to fluid flowline (in a manner known in the art as "piggybacked") that is to be installed subsea.

(2) Description of Related Art

Conventionally, fluid flowlines such as oil flowlines are arranged to transport oil from subsea wellheads and/or from offshore production platforms to oil and gas storage facilities and refineries onshore, and such flowlines are conventionally installed subsea in a reeled pipe lay operation from a flowline installation vessel such as a reel lay vessel such as the Seven Oceans operated by the present applicant Subsea 7.

In a lot of oil wells, the oil is relatively highly viscous and the viscosity increases the lower the temperature of the oil drops. Accordingly, it is conventional to heat the oil flowing through the flowlines in order to prevent the viscosity rising by using either induction heating or trace heating. In either case, electrical cables need to be run to provide the closed circuit required. In the induction heating case, the return cables are the DEH cables.

Figure 3:
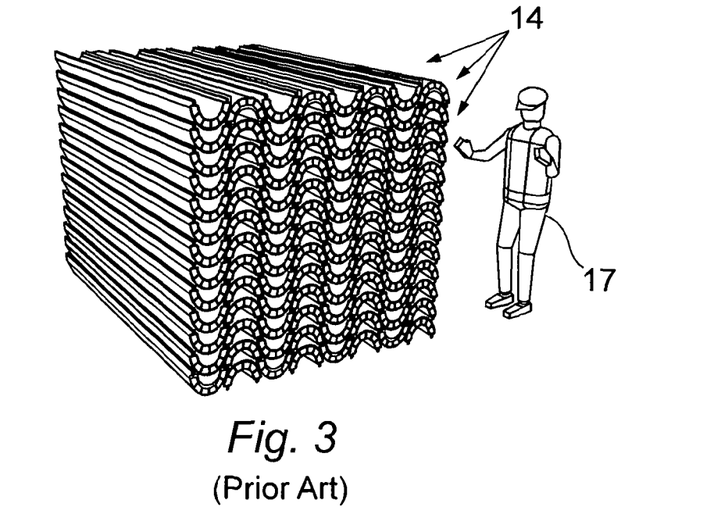
FIG. 3 is a perspective view of a number of cover sections 14 of the conventional MPS 10 in a stacked configuration for transportation and/or storage.
Figure 4:
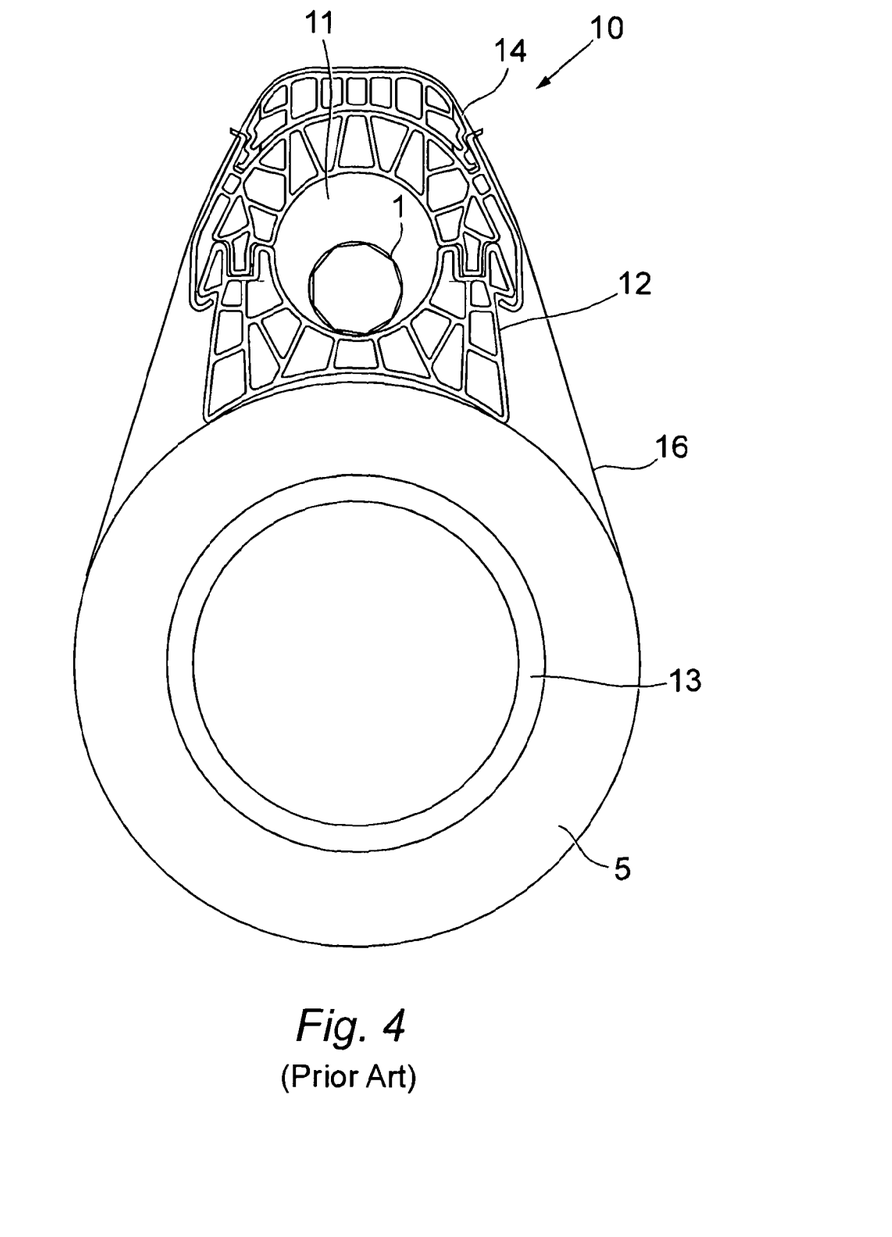
FIG. 4 is a cross sectional end view of the conventional MPS 10 of FIG. 1 shown in its in use configuration piggybacked on a flowline 3 with a DEH cable 1 being located in the cylindrical throughbore of the MPS 10 and being protected thereby.

FIG. 4 shows a conventional prior art DEH cable 1 which is arranged to provide electrical power to wire heating elements (not shown) installed at two or more longitudinally spaced apart locations in the side wall of a conventional steel flowline 3. As can be seen in FIG. 3, the flowline 3 is provided with suitable rigid insulation 5 in a conventional manner.

When installing flowlines 3 and DEH cables 1 on the sea bed, it is important to provide a Mechanical Protection System (MPS) for them in order to protect them (and particularly the otherwise exposed DEH cable 1) from dropped objects, fishing nets, anchors etc. as such objects can do great harm to DEH cables 1 and flowlines 3 which may result in the need to replace the whole flowline 3.

Figure 1:
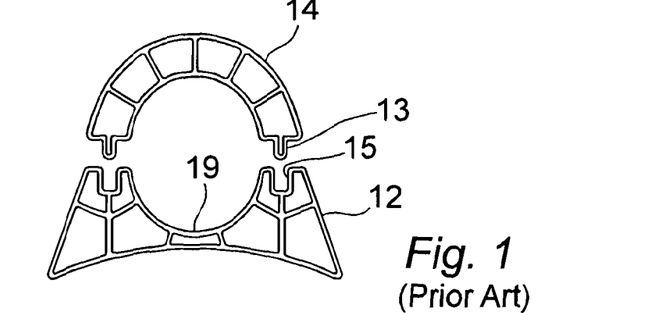
FIG. 1 is a cross sectional view of a cover section 14 being brought toward a gutter section 12 of the conventional MPS 10.
Figure 2:
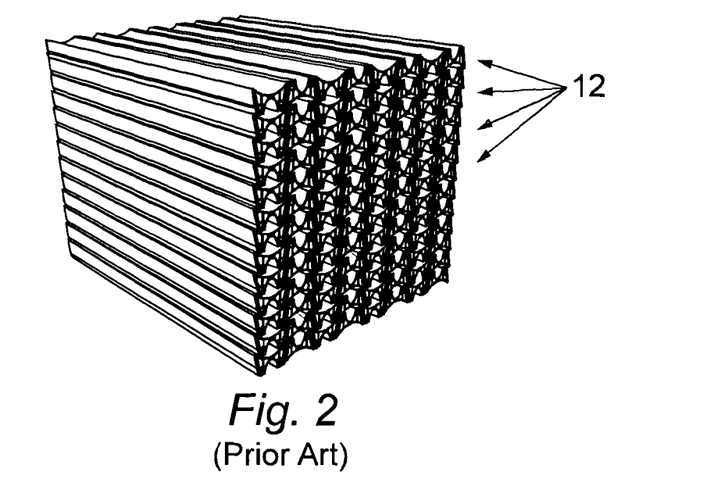
FIG. 2 is a perspective side view of a number of gutter sections 12 of the conventional MPS 10 in a stacked configuration for transportation and/or storage.

One such conventional MPS 10 that is not in accordance with the present invention is shown in FIGS. 1 to 4, in which:

FIG. 1 is a cross sectional view of a cover section 14 being brought toward a gutter section 12 of the conventional MPS 10;

FIG. 2 is a perspective side view of a number of gutter sections 12 of the conventional MPS 10 in a stacked configuration for transportation and/or storage;

FIG. 3 is a perspective view of a number of cover sections 14 of the conventional MPS 10 in a stacked configuration for transportation and/or storage; and FIG. 4 is a cross sectional end view of the conventional MPS 10 of FIG. 1 shown in its in use configuration piggybacked on a flowline 3 with a DEH cable 1 being located in the cylindrical throughbore of the MPS 10 and being protected thereby.

As best seen in FIG. 4, the conventional MPS 10 comprises a main body 12 in the form of a gutter section 12 and an upper cap 14 in the form of a cover section 14 and which are shown in more detail and in isolation in FIG. 1. The main body 12 and the upper cap 14 comprise a suitable key 13 and slot 15 which, when mated, realisably secure the upper cap 14 to the main body 12 such that the structure of the upper cap 14 and main body 12 when coupled provide a protective structure around a cylindrical through bore 11 which in use forms a protective cylindrical chamber 11 suitable for protecting the DEH 1.

As can be seen in FIG. 4, the DEH piggyback cable 1 is loosely installed inside the inner bore provided by the MPS 10, and can thus move freely inside the MPS 10 to accommodate flowline 3 thermal differential expansion and flexing of the two relative to each other that might occur during their installation and handling.

The conventional MPS 10 of FIGS. 1 to 4 is assembled as follows. The flowline 3 and its insulation 5 are pulled off the reel on the flowline installation vessel (not shown). An engineer 17 either manually picks up or with the use of a crane or the like lifts a main body 12 and rests it on top of the insulation 5 of the flowline 3. Each main body 12 is in the region of 2.6 meters or so long and can weigh in the region of 17 to 26 kg each.

The DEH cable 1 is then pulled off its own reel (not shown) by a suitable machine and is placed into the semi-circular lower through bore portion 19 of the main body 12 such that it rests therein and one length of upper cap 14 is manually picked up by the engineer 17 or can be lifted with a crane or the like and manipulated such that the key 13 is brought towards and is fitted into the slot 15 (it being shown in FIG. 1 as being brought toward). A metal band 16 is then manually applied around the outer surface of the upper cap 14 and the main body 12 and also the outer surface of the insulation 5 such that the metal banding 16 ensures that the MPS 10 is held securely against the flowline 3. The MPS 10 thereby provides a protective chamber within or in the form of its cylindrical throughbore 11 for the DEH cable 1.

However, such a conventional MPS 10 suffers from several disadvantages. For instance, the main body or gutter section 12 and also the upper cap or cover section 14 are typically 2.6 meters long. Therefore, for a typical 11 km length of flowline 3, 4230 gutter sections 12 and 4230 cover sections 14 would be required. These would typically be supplied to the flowline installation vessel on wooden pallets and typically 100 such pallets would be required and these would be supplied within 40 containers which would take up the available deck space on an installation vessel many times over. Accordingly, the flowline installation vessel would need to be supplied on a regular basis with for example 3 or 4 containers per supply run. Consequently, the transportation/supply costs are very expensive. Furthermore, such a conventional MPS 10 heavily relies on manual handling of 8460 gutter and cover sections in total for a typical 11 km length of flowline 3 and this therefore poses a significant safety risk to the engineers 17 involved. Furthermore, the assembly of the gutter 12 and cover 14 sections, particularly because of the manual assembly, is very time consuming.

It is an object of embodiments of the present invention to mitigate such disadvantages with the conventional MPS 10 but still provide a reliable and an assured protection system for a DEH cable 1.

BRIEF SUMMARY OF THE INVENTION

In accordance with the present invention there is provided a protection system for a secondary conduit adapted to be coupled to a main conduit, wherein both the main conduit and the secondary conduit are for installation below the sea surface, the protection system comprising:

an elongate member adapted to be spooled onto a reel for transportation and/or storage.

In accordance with the present invention there is provided a method of forming a protection system for a secondary conduit adapted to be coupled to a main conduit, wherein both the main conduit and the secondary conduit are for installation below the sea surface, the method comprising:

spooling an elongate member onto a reel for transportation and/or storage until such a time that it is ready to be deployed; and paying the elongate member out from the spool such that it forms the protection system for the secondary conduit.

The elongate member may be coupled to an external surface of the main conduit. The elongate member may be coupled to the main conduit in a piggyback manner. The external surface of the main conduit may be a layer of insulation. The elongate member may be coupled to the external surface of the main conduit using securing means, the securing means comprising a strap and/or band. The band may be a metal band.

The securing means may include a fixing member, the fixing member housing at least a portion of the elongate member; the fixing member may have a shape that compliments the external surface of the main conduit to which the fixing member is secured using the strap.

There may be more than one securing means attached to the main conduit. The securing means may be attached to the main conduit at intervals of between 4 and 5 meters along the longitudinal axis of the main conduit.

The securing means may further include a piggyback block; typically the piggyback block is U-shaped. The strap normally extends around an outer surface of the piggyback block and the external surface of the main conduit. The piggyback block normally extends around an outer surface of the elongate member and may be interposed between the outer surface of the elongate member and an inner surface of the strap.

The method of forming a protection system may include the use of one or more shock absorbing means formed on at least one of its inner and outer surface. The elongate member may be coupled to the main conduit using securing means; the securing means may comprise a strap.

Preferably, the elongate member is adapted to be transformable between at least two configurations:

a first configuration being a substantially planar configuration in which the elongate member is either spooled on or is suitable to be spooled on to the reel; and a second configuration being a substantially non-planar configuration in which the elongate member has been payed out from the reel and in which the elongate member has been at least substantially enveloped around the secondary conduit to provide protection thereto.

Preferably, the main conduit is a conduit through which fluid may flow and more preferably is an oil flowline. Typically, the secondary conduit is a cable and more preferably is a DEH cable used to provide electrical power to one or more trace heating mechanisms of the main conduit.

Typically, the elongate member is manufactured and more preferably is extruded in the second configuration and is biased to return to the second configuration if permitted. Preferably, when the elongate member is in the second configuration, the elongate member comprises a throughbore within which the secondary cable may be placed or inserted for protection. Preferably, when the elongate member is in the second configuration, the elongate member comprises a substantially cylindrical or tubular body substantially or wholly surrounding the throughbore. The elongate member may comprise one or more shock absorbing means, which may additionally or alternatively function as centralising means, formed on either and more preferably both of its inner and outer surface. The shock absorbing and/or centralising means are preferably one or more circumferentially spaced apart ribs which project substantially radially inwards or outwards respectively. Most preferably, the inwardly projecting ribs formed on the inner surface are staggered from and therefore are not radially aligned with the outwardly projecting ribs formed on the outer surface.

Preferably, when the elongate member is in the substantially planar configuration, it comprises a pair of edges which are arranged parallel to its longitudinal axis. More preferably, the elongate member is transformed from the substantially planar configuration to the substantially non-planar configuration by causing or allowing the edges to move from the planar configuration in which they are on opposite sides of the central longitudinal axis of the elongate member but lying on substantially the same plane to meet and preferably butt against one another. Typically, the elongate member is transformed from the substantially non-planar configuration to the substantially planar configuration by pulling the edges away from one another until they lie on the same plane as the central longitudinal axis of the elongate member.

Preferably, the elongate member is biased towards or into the non-planar configuration and more preferably, the elongate member is formed from a resilient material, and is preferably an elastomeric material, that will naturally return to a substantially cylindrical or tubular configuration in the absence of external forces acting to prevent such return. More preferably, the elongate member is formed in an extrusion process such that it is extruded in the substantially cylindrical or tubular configuration and more preferably, is cut through its sidewall to create the said pair of edges or is extruded with such edges already formed.

The elongate member is preferably an MPS and the main conduit is typically a flowline for carrying oil and the secondary conduit is typically an electrical cable such as a DEH cable to provide power to a trace heating system of the main conduit.

DETAILED DESCRIPTION OF THE INVENTION

Figure 5:
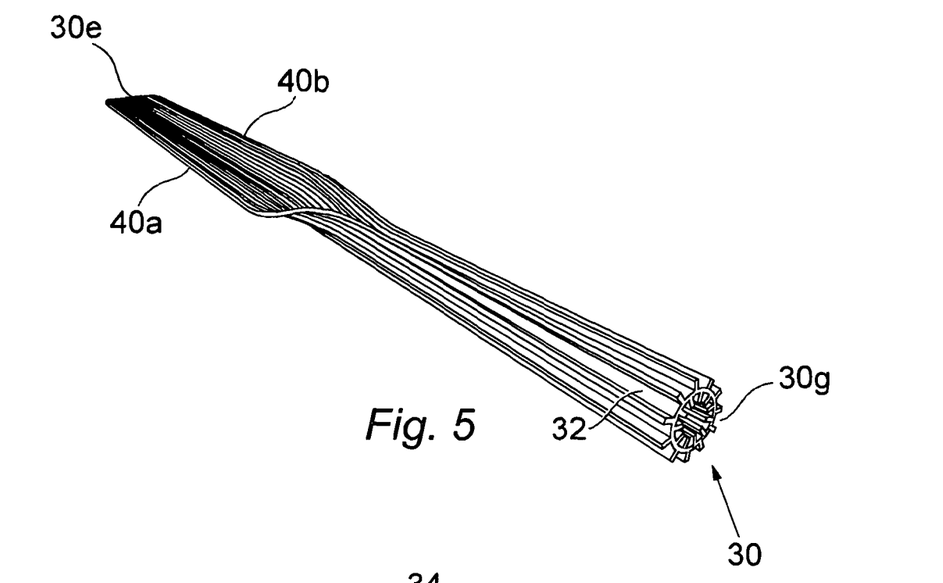
FIG. 5 is a perspective side view of a first and preferred embodiment of MPS in accordance with the present invention.
Figure 6:
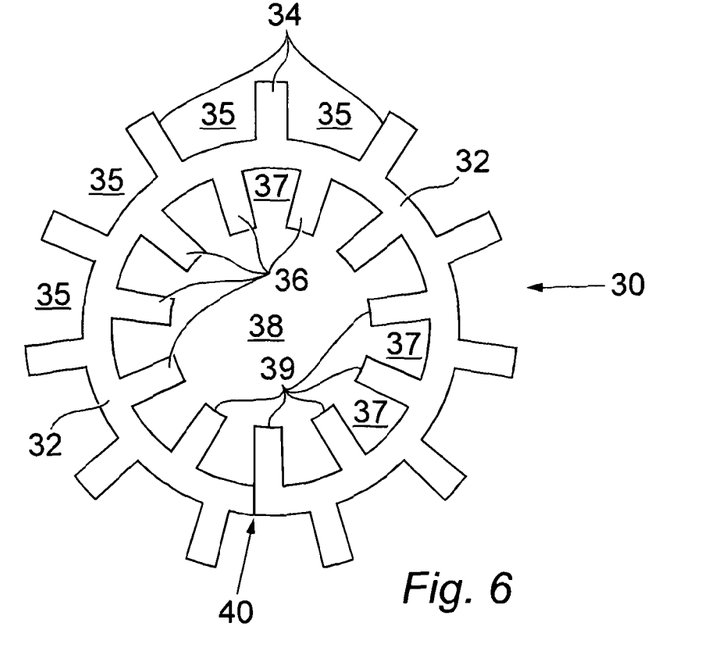
FIG. 6 is a cross sectional end view of the MPS of FIG. 5.
Figure 7:
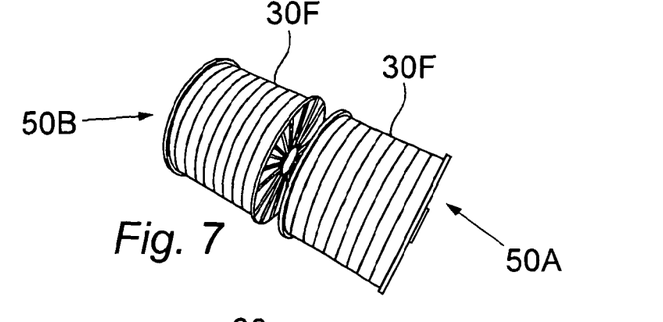
FIG. 7 is a perspective side view of two reels side by side.
Figure 8:
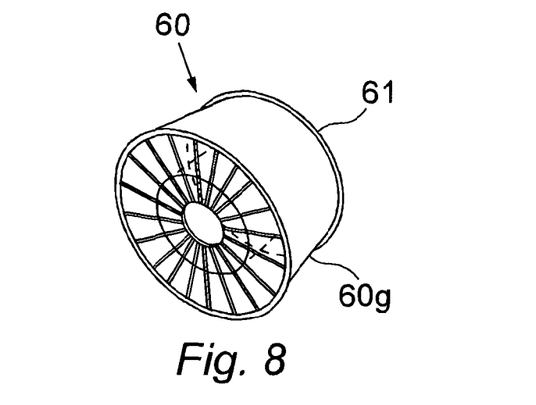
FIG. 8 is a perspective side view of a conventional reel.
Figure 9:
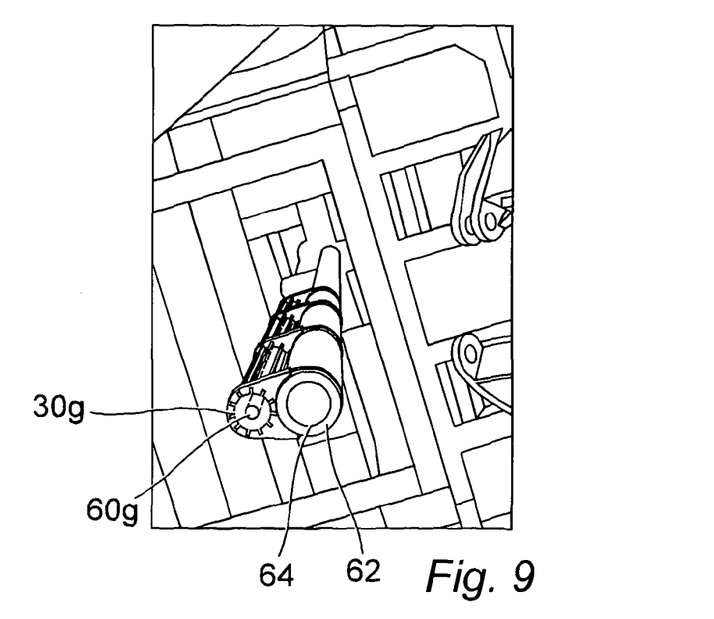
FIG. 9 is a perspective end view of the MPS of FIG. 5.
Figure 10A:
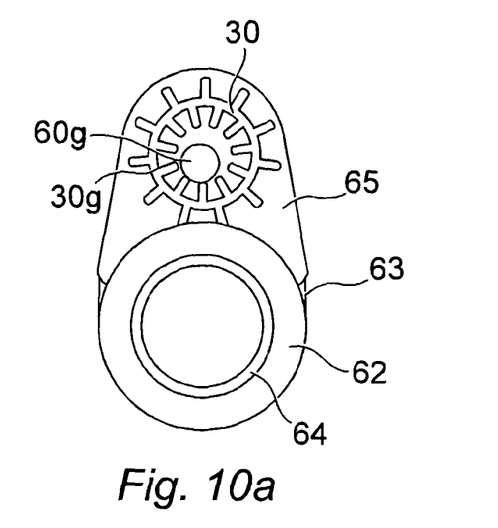
FIG. 10(a) is a more detailed end view of the MPS of FIG. 9.
Figure 10B:
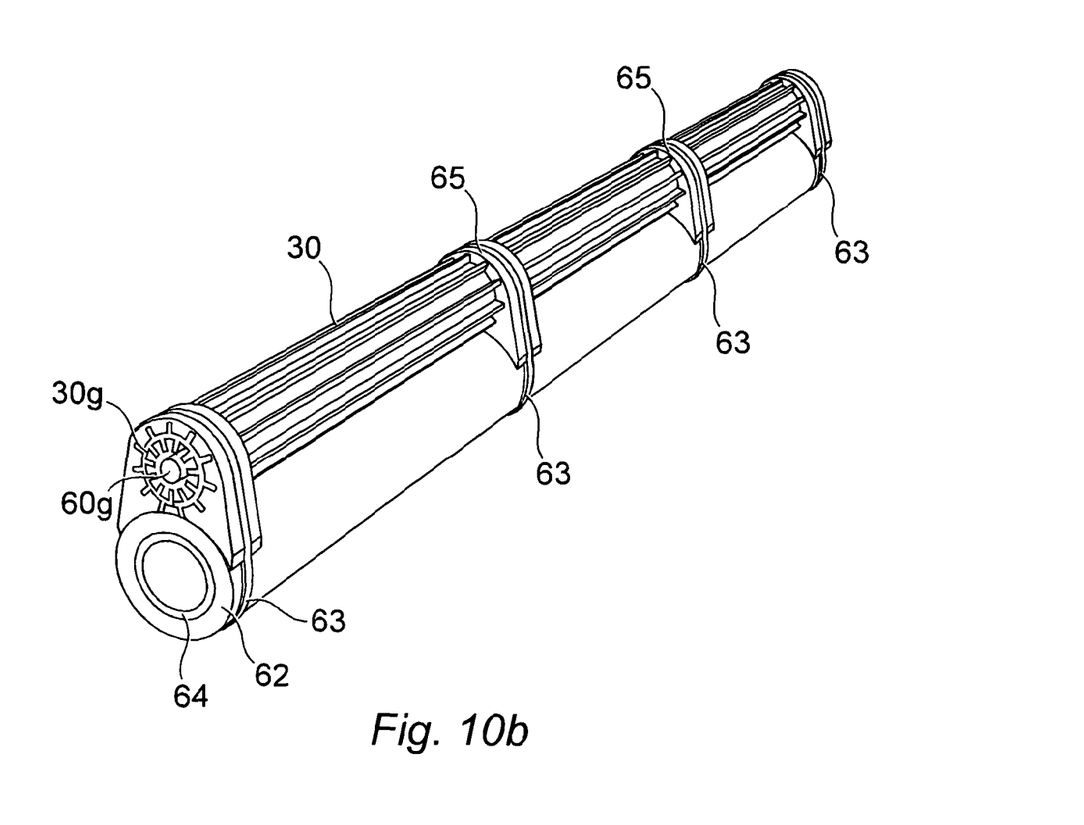
FIG. 10(b) is another more detailed perspective side view of the MPS of FIG. 9.
Figure 11:
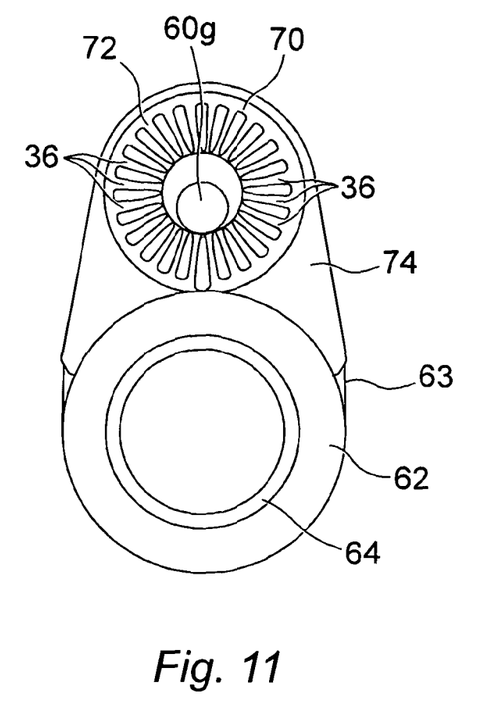
FIG. 11 is an end view of an alternative embodiment of an MPS.

Embodiments in accordance with the present invention will now be described, by way of example only, in which:

FIG. 5 is a perspective side view of a first and preferred embodiment of MPS in accordance with the present invention after having been pulled off or payed out from a reel and having been allowed or forced to transform from a flat configuration to its in use cylindrical configuration around a DEH cable (although the DEH cable is not shown in FIG. 5);

FIG. 6 is a cross sectional end view of the MPS of FIG. 5 after it has been allowed or forced into its cylindrical in use protection configuration (although the DEH cable is not shown);

FIG. 7 is a perspective side view of two reels side by side, each reel having the MPS of FIG. 5 being provided thereon in its flat configuration;

FIG. 8 is a perspective side view of a conventional reel holding a conventional DEH cable for use with the MPS of FIG. 5;

FIG. 9 is a perspective end view of the MPS of FIG. 5 piggybacked to a flowline and exiting the lay tower;

FIG. 10(a) is a more detailed end view of the MPS of FIG. 9 piggybacked to a flowline in the form of a twelve inch production pipeline;

FIG. 10(b) is another more detailed perspective side view of the MPS of FIG. 9 in the piggybacked in-use configuration and as installed on a flowline which is a twelve inch production pipeline; and FIG. 11 is an end view of an alternative embodiment of an MPS to that shown in FIG. 5, piggybacked to a flowline in the form of a twelve inch production pipeline.

FIG. 5 and FIG. 6 show a first and preferred embodiment of an MPS 30 in accordance with the present invention. The MPS 30 is formed from an extruded resilient material such as a suitable rubber or other type of elastomer such as a suitable grade of polyurethane, or a composite material formed from recycled and reconfigured elastomers of suitable properties (rubber tyres etc.). Additional mechanical properties can be added to the extrusion by incorporating composite fibres such as glass, polyester or Kevlar—aramid fibres which would increase the tensile strength, stiffness and cut resistance of the MPS 30.

The MPS 30 is extruded in the closed circular conduit arrangement shown in cross section in FIG. 6 and comprises a cylindrical body 32 which therefore forms a lengthy tubular or conduit as shown in the lower half of FIG. 5. The MPS 30 also comprises a number of outer ribs 34 which are substantially equi-spaced around the outer circumference of the cylindrical body 32 and which project radially outwardly therefrom such that there are annular gaps 35 formed between each pair of adjacent outer ribs 34. The ribs 34, 36 act to absorb the impact of any dropped objects or fishing nets or dragged anchors that may strike the MPS 30 and therefore act to protect a DEH cable 60 that resides within the MPS in use, as will be described subsequently.

The MPS 30 further comprises a plurality of inner ribs 36 which are substantially equi-spaced around the inner circumference of the cylindrical body 32 such that there are annular gaps 37 between each pair of adjacent inner ribs 36. As can be seen in FIG. 6, each of the inner ribs 36 project radially inwardly from the inner surface of the cylindrical body 32 to the same depth into the cylindrical throughbore 38 of the MPS 30 such that the inner end faces 39 of the inner ribs 36 will collectively form an inner circumference (albeit a staggered inner circumference 39) and which will support the outer surface of a DEH cable 60 as will be described subsequently.

Conveniently and preferably, the inner ribs 36 are offset or staggered with respect to the outer ribs 34 such that an inner rib 36 is radially aligned with an annular gap 35 on the outer surface and an outer rib 34 is radially aligned with an annular gap 37 on the inner surface and this has the advantage that the respective ribs 34, 36 will lie in the respective annular gaps 35, 37 of the adjacent upper and lower layers of MPS 30 when the MPS 30 is in the flat configuration and is rolled or spooled onto a reel 50 as will be described subsequently.

The MPS 30 is manufactured in a continuous manner such that each MPS 30 may be manufactured in either 5.5 km lengths if to be wound onto two reels 50 as shown in FIG. 7 or, if to be wound onto one giant reel, may be manufactured in one 11 km length. During manufacture, a radially extending cut 40 is formed all the way through the side wall of the cylindrical body 32 at one point on its circumference and furthermore is formed all the way along the entire length (i.e. 5.5 km or 11 km length) of the MPS 30 such that the MPS 30 is now no longer wholly cylindrical but has a first 40A and a second 40B side edge. The cut 40 may be formed in any suitable manner such as by a blade, saw or the like, during manufacture.

In order to wind the MPS 30 onto a reel for storage and transportation prior to installation subsea, each circular side edge 40A, 40B is grabbed by a suitable machine (not shown) or a splaying device (not shown) and is opened outwards such that the MPS 30 is transformed from a cylindrical body shape as shown in FIG. 6 to a flat body shape as shown in the upper half of FIG. 5 such that the body 32 all lies on the same plane and the side edges are now pointing away from one another and are also lying on the same plane as the central longitudinal axis of the elongated MPS 30. The first end 30E out of the extrusion machine is then secured into a MPS end holder (not shown) provided at the very centre of a reel 50 and the reel is then rotated at the same speed as the extruded MPS 30 is manufactured such that the MPS 30 is wound flat onto the reel 50. As shown in FIG. 7, two reels 50 have been wound, each with their own flattened MPS 30F. As the flattened MPS 30F is wound onto a reel 50, the inner ribs 36 of the present layer of MPS 30F are arranged to lie into the annular gaps 35 of the next inner most layer of flattened MPS 30F such that each layer of flattened MPS 30F takes up less radial space on the reel 50 than would otherwise occur.

Once a reel 50 has been provided with its predetermined length of flattened MPS 30F, it can be transported to the flowline installation vessel and can be safely stored thereon whilst taking up significantly less space than a conventional MPS paleted system (e.g. such as the prior art system shown in FIGS. 2 and 3).

When it is desired to install a flowline 64 with outer insulation 62 as shown in FIG. 9 subsea such as on the subsea surface (i.e. the seabed bottom), the outer most end 30g (that is the end 30g that was wound onto the reel 50 last) is taken in its flattened form and is held securely in its flattened form and is presented into the lay tower using a loading tugger line (not shown) from the work station on the installation vessel and is presented into close proximity to the outer most end 60G of the DEH cable 60 which is held on a separate reel 61. The end 60G of the DEH cable 60 is pulled off its storage reel 61 using the same loading tugger line as used for the end 30G of the MPS 30 such that the end 60G is pulled into close proximity with the end 30G of the MPS 30. The 2 paths of the ends 60G and 30G are combined into one by directing and guiding them together and the two combined paths of the ends 30G and 60G are passed through a "zip up" station which is set up between the two storage reels 50, 60. Within the zip up station (not shown), the end 30G of the flattened MPS 30 is allowed to return to its original round or cylindrical shape as shown in the lower half of FIG. 5 or in the end view shown in FIG. 6 whilst the DEH cable 60 is inserted therein. Indeed, the flattened MPS 30 will try to return to its original round or cylindrical shape as shown in the lower half of FIG. 5 or in the end view shown in FIG. 6 because it is resilient by manufacture to the cylindrical shape. Accordingly, the two ends 40A, 40B close around the DEH cable 60 such that the DEH cable 60 is located within the cylindrical throughbore 38 of the now circular MPS 30 and is therefore substantially or more preferably entirely enveloped by the side wall of the cylindrical body 32 of the now circular MPS 30. Furthermore, because the MPS 30 is preferably formed from a material that is resilient and is therefore biased into the circular configuration shown in FIG. 6, it naturally wishes to return to that position and therefore does not require much if any energy to move it from the flattened configuration to the cylindrical configuration.

Now that the DEH cable 60 is surrounded by the MPS shroud 30, the combined shrouded cable 30, 60 is passed over the aligner wheel piggyback gutter as it would be in a normal piggyback operation, and the gutter can be enlarged if required.

As shown in FIG. 9, the piggybacked DEH cable 60 and MPS 30 are then strapped to the flowline 64 (more accurately are strapped to its insulation 62) by metal banding 63 which is conveniently placed every 4 to 5 meters or so along the length of the flowline 64. The metal banding 63 is strapped around the outer surface of the insulation 62 on a plane that is perpendicular to the longitudinal axis of the flowline 64. However, a piggyback block 65 is placed around the outer surface of the MPS 30 and the metal banding 63 is run around the outer surface of the piggyback block 65 such that the piggyback block is interposed between the outer surface of the reel-able MPS 30 and the inner surface of the metal banding 63. The piggyback block 65 is substantially U shaped in profile and comprises a number of slots formed around its inner central portion where the slots are suitable shaped to accommodate the outer ribs 34 of the reel-able MPS 30 such that the piggyback block 65 will assist in keeping the reel-able MPS 30 in a secured position in a piggyback manner on the flowline 64. The piggyback blocks 65 are preferably formed from a resilient elastomeric material such that they will also absorb the impact of any dropped objects or fishing nets or dragged anchors that may strike the piggyback blocks 65. As can be seen in FIG. 9, the piggyback blocks 65 and then the metal banding have been applied to the outer surface of the reel-able MPS 30 and the outer surface of the insulation 62, where the piggyback block 65 are typically spaced apart every 4 to 5 meters and depending on the MPS 30 material and content stiffness, may be spaced apart every 6 to 12 m or so along the entire length of the flowline 64. The reel-able MPS 30 is therefore brought together with the flowline 64 in the lay tower work station such that the two are combined with the piggyback block 65 and the metal banding strap 63 and the combined apparatus as shown in FIG. 10 can then be laid into the sea as required to install the flowline 64 on the subsea surface.

The outer ribs 34 and inner ribs 36 also function to absorb the shock of any object striking or hitting the reel-able MPS 30 and therefore act to protect the DEH cable 60.

As shown in FIG. 7, the flat reel-able MPS 30F can be conveniently stored on two reels such that when the flat reel-able MPS 30F of the first reel 50A has been fully unwound, it is a straightforward task to feed the outer most end 30g of the second length of flat reel-able MPS 30 from the second reel 50B into the lay tower using the loading tugger line from the work station in a similar manner to that previously described.

An alternative embodiment of MPS 70 is shown in FIG. 11 and comprises only inwardly projecting ribs 36 such that the body 72 comprises a smooth outer surface to the outer environment. This may be preferable when using conventional piggyback installation techniques and conventional piggyback blocks 74 with the same metal banding strap 63 as previously described but this embodiment does have the disadvantage that it will likely take up more space on the reel 50 than the preferred first embodiment of MPS 30.

Accordingly, embodiments of the present invention have the advantage that they can be supplied on one or two conventional reels such as 9.2 meter diameter reels and can therefore take up significantly less deck space which will provide significant cost savings and also time savings in subsea laying operations. Furthermore, embodiments of the present invention provide safety enhancements to such installation jobs because there is no or only minimal manual handling required in that the MPS 30, 70 is located on a reel and is therefore reel 50 deployed. Furthermore, embodiments of the present invention will provide significant time savings and the cost savings associated therewith in relation to the installation time for flowlines to be installed subsea, due to the reel mounted nature of the MPS 30, 70.

Individual lengths of the reelable MPS 30, 70 can be joined together using suitable fasteners (not shown) or bonded together without detracting from the shape and protection offered by the system 30, 70.

An alternative location of the zipping-up station can be provided in the lay tower above the piggyback block 65, 74 installation station. This could allow the reelable MPS 30, 70 to be transported to the installation site using conventional rollers and conveyor belt or transmission belt technology, from the storage reel or carousel somewhere on deck or below the main deck, in the hold.

Modifications and improvements may be made to embodiments of the present invention as here and before described without departing from the scope of the invention.

The invention claimed is:
1. A method of forming a protection system for a secondary conduit adapted to be coupled to a main conduit, wherein both the main conduit and the secondary conduit are for installation below the sea surface, the method comprising:
spooling onto a reel a resilient elongate member from a first configuration for transportation and/or storage until such a time that it is ready to be deployed, the first configuration being a substantially planar configuration, and wherein the elongate member comprises a plurality of ribs extending along a length of the elongate member;
paying the elongate member out from the reel;
causing or allowing the elongate member to adopt a second configuration and form the protection system for the secondary conduit, the second configuration being a substantially cylindrical configuration for surrounding and protecting the secondary conduit when the elongate member has been unspooled from the reel; and
coupling the elongate member with the secondary conduit retained within it to an external surface of the main conduit.

2. A method of forming a protection system according to claim 1 wherein the main conduit is a conduit through which oil flows.

3. A method of forming a protection system according claim 1 wherein the secondary conduit carries an electrical cable.

4. A method of forming a protection system according to claim 1 wherein when the elongate member is in the substantially planar configuration and comprises a pair of edges which are arranged parallel to its longitudinal axis, the elongate member being transformed from the substantially planar configuration to the substantially cylindrical configuration by causing or allowing the edges to move from the planar configuration in which they are on opposite sides of a central longitudinal axis of the elongate member but lying on substantially the same plane to meet and butt against one another.

5. A method of forming a protection system according to claim 1 wherein when the elongate member is in the substantially planar configuration and comprises a pair of edges which are arranged parallel to its longitudinal axis the elongate member is transformed from the substantially cylindrical configuration to the substantially planar configuration by pulling the edges away from one another until they lie on the same plane as the central longitudinal axis of the elongate member.

6. A method of forming a protection system according to claim 1 wherein the elongate member is coupled to an external surface of the main conduit using a securing strap.

7. A method of forming a protection system according claim 6 further comprising a fixing member, the fixing member housing at least a portion of the elongate member and wherein the fixing member has a shape that complements the external surface of the main conduit to which the fixing member is secured using the strap.

8. A protection system for a secondary conduit adapted to be coupled to a main conduit, wherein both the main conduit and the secondary conduit arc for installation below the sea surface, the protection system comprising:
  a resilient elongate member transformable between a substantially planar configuration for spooling on a reel, and a substantially cylindrical configuration for surrounding and protecting the secondary conduit when the elongate member has been unspooled from the reel;
  wherein the elongate member comprises a plurality of ribs extending along a length of the elongate member; and
  wherein the elongate member with the secondary conduit retained within it is adapted to be coupled to an external surface of the main conduit.

9. A protection system according to claim 8 wherein the plurality of ribs are formed on both an inner and an outer surface of the elongate member in the substantially cylindrical configuration.

10. A protection system according to claim 9 wherein at least some of the ribs are formed on the inner surface and are adapted to centralize the secondary conduit in the protection system.

11. A protection system according to claim 9 wherein in the substantially cylindrical configuration the ribs are circumferentially spaced apart and project substantially radially.

12. A protection system according to claim 11 wherein there are inwardly and outwardly projecting ribs and the inwardly projecting ribs formed on the inner surface are staggered from and therefore are not radially aligned with the outwardly projecting ribs formed on the outer surface.

13. A protection system according to claim 8 wherein the elongate member is biased towards or into the non-planar configuration.

14. A protection system according to claim 13 wherein the elongate member is formed from an elastomeric material adapted to return to the substantially cylindrical configuration in the absence of external forces acting to prevent such return.

15. A protection system according to claim 13 wherein the elongate member is formed in an extrusion process such that it is extruded in the substantially cylindrical configuration.

16. A protection system according to claim 8 wherein the elongate member is cut through a sidewall to create a pair of edges.

17. A protection system according to claim 8 wherein the elongate member is extruded with a pair of edges already formed.

18. A protection system according to claim 8 wherein the elongate member is a mechanical protection system and the main conduit is a flowline for carrying oil and the secondary conduit is an electrical cable to provide power to a trace heating system of the main conduit.

* * * * *